United States Patent
Jenevein et al.

(10) Patent No.: US 6,615,365 B1
(45) Date of Patent: Sep. 2, 2003

(54) STORING A COMPUTER DISK IMAGE WITHIN AN IMAGED PARTITION

(75) Inventors: Roy M. Jenevein, Austin, TX (US); Heidi S. Kramer, Orem, UT (US); Derrick S. Shadel, South Jordan, UT (US); Andy V. Lawrence, Alpine, UT (US); Val A. Arbon, Orem, UT (US)

(73) Assignee: PowerQuest Corporation, Orem, UT (US)

( * ) Notice: Subject to any disclaimer, the term of this patent is extended or adjusted under 35 U.S.C. 154(b) by 0 days.

(21) Appl. No.: 09/532,223

(22) Filed: Mar. 22, 2000

Related U.S. Application Data
(60) Provisional application No. 60/188,671, filed on Mar. 11, 2000.

(51) Int. Cl.$^7$ ................................. G06F 11/00
(52) U.S. Cl. ..................... 714/6; 714/54; 711/162; 711/161
(58) Field of Search ................. 714/3, 5, 6, 8, 714/7, 20, 162, 161; 707/204; 713/187, 189

(56) References Cited

U.S. PATENT DOCUMENTS

| | | | |
|---|---|---|---|
| 5,418,918 A | | 5/1995 | Vander Kamp et al. ..... 395/375 |
| 5,537,540 A | * | 7/1996 | Miller et al. .................... 714/38 |
| 5,675,769 A | | 10/1997 | Ruff et al. ............. 395/497.04 |
| 5,706,472 A | | 1/1998 | Ruff et al. ............. 395/497.04 |
| 5,758,056 A | * | 5/1998 | Barr .................................. 714/8 |
| 5,758,165 A | | 5/1998 | Shuff .......................... 395/712 |
| 5,829,045 A | | 10/1998 | Motoyama ................... 711/162 |
| 5,852,713 A | * | 12/1998 | Shannon .......................... 714/6 |
| 5,907,672 A | * | 5/1999 | Matze et al. ..................... 714/7 |
| 5,930,831 A | | 7/1999 | Marsh et al. ................. 711/173 |
| 6,047,294 A | * | 4/2000 | Deshayes et al. ............ 707/204 |
| 6,115,705 A | * | 9/2000 | Larson ........................... 707/3 |
| 6,151,685 A | * | 11/2000 | Li et al. ........................... 714/6 |
| 6,195,695 B1 | * | 2/2001 | Cheston et al. ............. 709/221 |

OTHER PUBLICATIONS

Ron White, How Computers Work, Sep. 2001, Que, 6th Edition, pp. 136–137.*
Patent Application PCT/US98/16992, publication No. WO 99/09513, Feb. 25, 1999.
Norton Ghost Competitive Matrix, no later than Jun. 4, 1999.
RapiDeploy from Altiris lets you sleep tonight, no later than Jun.3, 1999.
"RapiDeploy", PC Magazine, May 4, 1999.

(List continued on next page.)

Primary Examiner—Nadeem Iqbal
Assistant Examiner—Tim M. Bonura
(74) Attorney, Agent, or Firm—Computer Law ++

(57) ABSTRACT

The invention provides systems and methods for storing and recovering images in a computer partition, and more particularly to tools and techniques for placing and extracting images to and from the same partition that is imaged. Both a factory image and a user-updateable image may be stored on the same partition. Copies of a portion of the partition data and/or the system data for the imaged partition can be stored at a specified location within the imaged partition, in a separate partition, or on a removable recovery medium, thereby allowing images to be recovered after disruption of the imaged partition's system data. The image may be stored contiguously or non-contiguously. The image may also be stored as a system file or as an image container which comprises one or more than one image file. To speed restoration time and to assist recovery, the image may be stored at or near the end of the partition. Familiar or novel image formats may be used. By storing one or more partition images in the imaged partition, the invention eliminates consumer confusion between bootable partition size and disk size, without sacrificing the advantages provided by imaging.

68 Claims, 5 Drawing Sheets

OTHER PUBLICATIONS

"Performance Tests", PC Magazine, May 4, 1999.
"Drive Image 2.0", PC Magazine, May 4, 1999.
"ImageCast IC3", PC Magazine, May 4, 1999.
About Ghost, no later than Oct. 21, 1997.
Norton Ghost for NetWare: White Paper, no later than Aug. 10, 1999.
Taking the tedium out of installs, Nov. 6, 1996.
GHOST Manual, pp. 1–4, 1997.
ShrinkWrap 2.1, no later than Jul. 30, 1998.
PowerQuest Drive Image™ User Guide (entire manual), Manual Edition 3, 1998–1999.
The UNIX™ Operating System, Apr. 29, 1997.
Hard Drive Management, Dec. 1996.
Installing NT to an NTFS partition larger than 4GB, no later than May 17, 1999.
Review: DriveImage 2.0 DriveCopy 2.0, no later than Apr. 28, 1999.
DiskClone, no later than May 6, 1999.
Partitioning, Apr. 15, 1999.
Lost&Found Product Information, no later than Apr. 30, 1999.
GHOST Software, no later than Apr. 29, 1999.
PowerQuest in OEM deal with WinBook, Aug. 11, 1998.
PartitionMagic 3.0 White Paper, no later than May 4, 1999.
Image–based Backup Versus File by File Backup, no later than May 4, 1999.
Drive Image Version 2.0, Jul. 1998.
True Image Backup White Paper, no later than May 6, 1999.

* cited by examiner

STORING A COMPUTER DISK IMAGE WITHIN AN IMAGED PARTITION

RELATED APPLICATIONS

The present application claims priority to and incorporates by reference commonly owned U.S. provisional patent application serial No. 60/188,671 filed Mar. 11, 2000.

FIELD OF THE INVENTION

The present invention relates to storing and recovering computer disk images in a computer partition. More particularly, the invention provides tools and techniques for placing images in the same partition that is being imaged, and for extracting information from images stored in the imaged partition, thereby allowing single large partitions to be used more effectively.

TECHNICAL BACKGROUND OF THE INVENTION

Computers Generally

Computer hard disks and other computer storage devices hold digital data which represents numbers, names, dates, text, pictures, sounds and other information used by businesses, individuals, government agencies, and others. To help organize the data, and for technical reasons, many computers divide the data into drives, partitions, directories, and files. The terms "file" and "directory" are familiar to most computer users, and most people agree on their meaning even though the details of written definitions vary.

However, the terms "partition" and "drive" have different meanings even when the context is limited to computers. According to some definitions, a partition is necessarily limited to one storage device, but a "file system" may include one or more partitions, on one or more disks. Many partitions reside on a single disk, but some approaches, such as volume sets, stripe sets, mirror sets, and others, store a single partition's data on more than one disk.

As used here, a "partition" is a region on one or more storage devices which is (or can be) formatted to contain one or more files or directories. A partition may be empty. A partition may also be in active use even without any directories, file allocation tables, bitmaps, or similar file system structures if it holds a stream or block of raw data. Each formatted partition is tailored to a particular type of file system, such as the Macintosh file system, SunOS file system (a variant of the UNIX file system), Linux file system (EXT2fs, a variant of the UNIX file system), Windows NT File System ("NTFS"), NetWare file system, Linux file system, or one of the MS-DOS/FAT file systems. (MACINTOSH is a trademark of Apple Computer, Inc.; SunOS is a trademark of Sun Microsystems, Inc.; WINDOWS NT and MS-DOS are trademarks of Microsoft Corporation; NETWARE is a trademark of Novell, Inc.; LINUX is a mark of Linus Torvalds).

Computers utilize a wide variety of storage devices as storage media for user data. Storage technologies currently provide removable optical, and magnetic disks, fixed and removable hard disks, floppy disks, solid state storage devices, and new storage technologies are continually being actively researched and developed. Indeed, some storage devices used by computers in the future may be cubical or some other shape with no moving parts rather than flat and circular, and in addition, storage devices which use computer chips as storage media are being developed. Disks, storage devices and related concepts such as cylinders, sectors, platters, tracks, heads, physical sector addresses, and logical sector addresses are generally familiar in the art. For instance, they are discussed in U.S. Pat. Nos. 5,675,769 and 5,706,472 assigned to PowerQuest Corporation, and those discussions are incorporated herein by this reference.

An operating system manages access, not only to the disks, but to other computer resources as well. Resources typically managed by the operating system include one or more disks and disk drives, memory (RAM and/or ROM), microprocessors, and I/O devices such as a keyboard, mouse, screen, printer, tape drive, modem, serial port, parallel port, or network port.

Many disks mold the available space into one or more partitions by using a partition table located on the disk. A wide variety of partition types are used, and more partition types will no doubt be defined over time. A partial list of current partitions and their associated file systems is given in U.S. patent application Ser. No. 08/834,004 and incorporated here by reference. The list includes a variety of 12-bit, 16-bit, and 32-bit FAT file systems and numerous other file systems. Tools and techniques for manipulating FAT and certain other partitions are described in U.S. Pat. Nos. 5,675,769 and 5,706,472 assigned to PowerQuest Corporation, incorporated herein by this reference.

One partition table composition, denoted herein as the "IBM-compatible" partition table, is found on the disks used in many IBM® personal computers and IBM-compatible computers (IBM is a registered trademark of International Business Machines Corporation). Although IBM is not the only present source of personal computers, server computers, and computer operating systems and/or file system software, the term "IBM-compatible" is widely used in the industry to distinguish certain computer systems from other computer systems such as Macintosh computer systems produced by Apple Computer (Macintosh is a market of Apple Computer) and UNIX computer systems. IBM-compatible partition tables may be used on a wide variety of disks, with a variety of partition and file system types, in a variety of ways.

As shown in U.S. Pat. Nos. 5,675,769 and 5,706,472, one version of an IBM-compatible partition table includes an Initial Program Loader ("IPL") identifier, four primary partition identifiers, and a boot identifier. As also shown in those patents, each partition identifier includes a boot indicator to indicate whether the partition in question is bootable. At most one of the partitions in the set of partitions defined by the partition table is bootable at any given time.

Each partition identifier also includes a starting address, which is the physical sector address of the first sector in the partition in question, and an ending address, which is the physical sector address of the last sector in the partition. A sector count holds the total number of disk sectors in the partition. A boot sector address holds the logical sector address corresponding to the physical starting address.

Some IBM-compatible computer systems allow "logical partitions" as well as the primary partitions just described. All logical partitions are contained within one primary partition; a primary partition which contains logical partitions is also known as an "extended partition."

Each partition identifier also includes a system indicator. The system indicator identifies the type of file system contained in the partition, which in turn defines the physical arrangement of data that is stored in the partition on the disk. Values not recognized by a particular operating system are treated as designating an unknown file system. The file system associated with a specific partition of the disk determines the format in which data is stored in the partition, namely, the physical arrangement of user data and of file system structures in the portion of the disk that is delimited by the starting address and the ending address of the partition in question. At any given time, each partition thus contains at most one type of file system.

Data Backup Approaches

Many computers are sold with operating systems, application programs, and other data already loaded on the disk. Manufacturers and vendors of computers often would like to provide users with a backup or image of the information they originally loaded on a hard drive. Two basic approaches are used in conventional systems and methods to backup computer data. One approach is generally file-oriented, while the other approach deals with files but operates primarily on clusters, sectors, runs, or similar logical allocation units which are smaller than files.

A file-oriented backup approach is illustrated in FIG. 1. A partition 100 includes system data 102 and user data 104. The system data 102 includes file system data such as sector or cluster allocation maps or tables and directories. The system data 102 also includes operating system data such as partition tables and boot code. The user data 104 includes data created by users, such as word processor or spreadsheet files, as well as application programs, dynamic libraries, and other data which is loaded by the vendor or system integrator and organized in the partition by the file system structures. As shown, this backup approach copies the user data 104 to a backup medium 106, such as a ZIP disk (mark of Iomega), a tape drive, a writable CD, a WORM drive, or a collection of floppy disks.

With such a file-by-file backup, each file is backed up separately, and can be recovered separately. This can be advantageous. However, file-oriented approaches also have some disadvantages. File-by-file backup programs access the user data 104 through standard operating system and/or file system routines, and they require that the operating system and file system software be reinstalled prior to system recovery. They may miss important files such as registry or system configuration files, and they do not back up data 104 from deleted files even if the sector(s) holding the data have not been overwritten. In addition, a single file may be stored in a series of clusters at locations scattered across the disk. To restore such a file, the disk head must be randomly positioned multiple times across the platter, which increases restoration time and increases the chance of a disk head crash.

FIG. 2 shows an imaging approach which also restores files but deals primarily in clusters or another file allocation unit which is typically smaller than a file. Unlike the file-oriented backup shown in FIG. 1, the imaging backup approach shown in FIG. 2 copies the entire disk state. An image may be created on the backup medium 106 by reading and writing each sector, in order, in one or more partitions 100 of a disk. Usually unallocated sectors are skipped.

This imaging approach can backup all data 102, 104, including data in deleted files when that data has not been overwritten, file system structures, operating system files, device drivers, information about network cards and other installed hardware, application programs, user-created files, hidden files, and all other data 102, 104 stored in the selected partition(s) 100. Some imaging approaches also copy partition table information to the backup medium 106. When a full disk image is restored, every byte of the original disk is restored, including all system and user data, including disk partitions, operating systems information, user files, and boot sector data. A sector-by-sector image preserves optimizations, producing an exact image of the disk, with the exception that some images do not contain data from unallocated sectors.

The imaging approach facilitates sequential head moves across the disk platters in so-called "elevator seeks", thereby decreasing both the time needed to backup or restore entire partitions and/or disks, and decreasing the chance of a head crash. Imaging of the type shown in FIG. 2 can be performed using the Drive Image product which is commercially available from PowerQuest Corporation of Orem, Utah (DRIVE IMAGE is a registered trademark of PowerQuest).

With either the file-oriented approach shown in FIG. 1 or the sector imaging approach shown in FIG. 2, the backup medium 106 may be a disk containing a target partition other than the partition 100. The target partition may or may not be the partition 100; the partition 100 and the target partition may be on the same disk, or they may be on two disks on the same computer. The source and target computers may also be connected by a network link, as when the target partition is directly attached to a network server to receive backup images of partitions 100 on clients of the server.

One backup method according to FIG. 2 involves two partitions on a drive. The first partition is the source partition 100, which contains all the user programs and data 104, while the target partition is separate partition 106 on the same drive; the partition 106 often contains little or nothing more than an image of the first partition 100. For example, a 10 GB hard drive might contain two partitions, namely, an 8 GB partition 100 with the system files and pre-installed software and a 2 GB partition 106 that contains a disk image of the partition 100.

However, manufacturers are sometimes reluctant to divide disk drives into more than one partition, because some computer purchasers equate the size of their main partition (for instance, the so-called "C: drive" on many IBM-compatible computers) with the size of the entire disk. If the primary partition on a new disk drive is substantially smaller than the advertised disk size, purchasers may conclude that the disk drive itself is smaller than they requested. In the example above, a user might erroneously conclude that the computer came with an 8 GB drive rather than the expected 10 GB drive, because the bootable partition 100 contains only 8 GB. This mistaken but understandable conclusion leads to consumer dissatisfaction and increases the vendor's support costs.

Another problem facing the computer user is how to acquire a fully functional backup of both system and user data. Many critical system files, such as the registry files which contain critical configuration information, are open when a computer is running in the Microsoft Windows 95, Windows 98, and Windows NT operating systems. Even if an approach like that shown in FIG. 2 is used, these open files cannot be successfully saved by standard backup software. If a computer's hard disk crashes and all files must be rebuilt, some user files 104 can be restored. But the operating system, device drivers, and perhaps even the backup software itself, all must be reinstalled from some source other than the image 106. Data files that were open when the backup was made also would not be restored from the image 106.

Accordingly, it would be an advancement in the art to provide improved data backup tools and techniques, including tools and techniques for avoiding consumer confusion about disk size while still providing backup images.

Such improved tools and techniques are disclosed and claimed herein.

BRIEF SUMMARY OF THE INVENTION

The present invention provides tools and techniques for storing and retrieving data images of a partition within the imaged partition. As used here, "in-partition images" are images of a partition stored within the imaged partition. An image created in the factory before delivery to the user (a factory image) as well as one or more user-updateable images can be stored in the same partition. The in-partition images themselves may be compressed, or not compressed, packed or not packed, and/or encrypted or unencrypted. The in-partition images may be stored as one or more files within the file system, or as an image container. If the image file would be larger than the maximum file size allowed for a particular operating system, (often 2 GB) the image may be divided into multiple files that together make up all or part of the container. The image may also be divided into multiple files to facilitate later transfer to multiple smaller storage media, such as writable removable media. To speed restoration time and to assist recovery, the image may be stored contiguously at or near the end of the partition, but is not restricted to either being contiguous or at the end of the partition. For improved efficiency, the image file or image container can be stored in a separate subdirectory of the imaged partition.

In one embodiment, creation of an image within a partition creates an exact copy of the entire partition, including deleted but not overwritten files. Each sector of the partition, in order, is read into the image. The image must be created when the computer has been put into a state that allows exclusive disk access. This prevents inconsistencies in the data and helps ensure that system files such as the Microsoft Windows registry are closed and thus can be imaged. When the image is made of the partition, the image itself is not imaged. However, user images may be incrementally updated.

If more than one image is stored on a single partition, a user can choose which image should be used to restore the partition. If the disk or its partition is damaged, it may still be possible to recover the imaged data. Copies of a portion of the partition data and/or the system data sufficient to recover the imaged partition can be stored at a specified location within the imaged partition, within the image container, in a separate diagnostic and recovery partition, and/or on a removable recovery medium such as a ZIP drive, a floppy disk, and so on. Which system files or other data should be saved depends both on the operating system involved and the nature of the image. Using the saved system data, the image can then be located on the partition and restored. The image files and/or image container may also contain unique signature bytes to allow them to be detected by scanning the storage medium. In this way, if the disk or partition is damaged, the image may be discovered and used to restore the partition.

In one embodiment the file system data is verified when it is used, such as before an image is created or updated, after an image is created or updated, and when system data is stored in a separate location such as in a recovery disk or in a diagnostic and recovery partition. The consistency and integrity of the image itself is also verified when used, such as after it is created or updated, and before and after it has been used to restore user data. This can be performed by way of check codes such as checksums or CRC codes embedded in the image files and/or the image container.

The image can be restored to a number of locations, including target locations inside the same partition that contains the image, another partition on the same machine, another partition on a physically different machine (such as over a network connection), or onto a removable medium. One or more files from the image can be individually restored without restoring the entire image. Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

Figure 2:
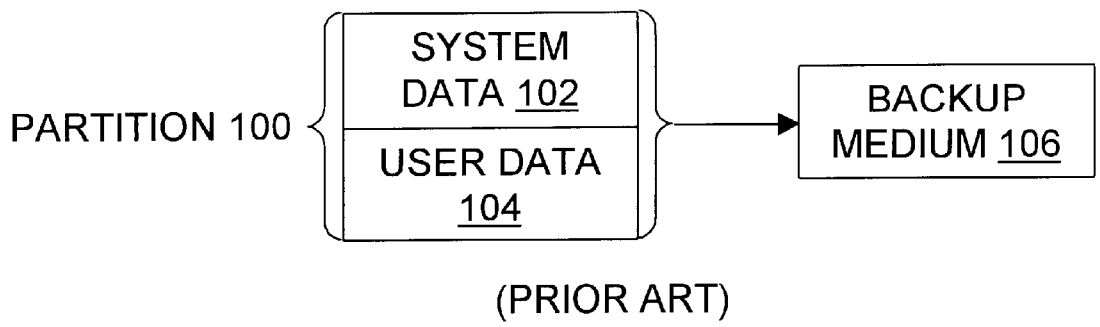
FIG. 2 is a diagram illustrating a conventional imaging approach which copies user data and file system data from a source partition to a different medium and/or a destination partition.
Figure 3:
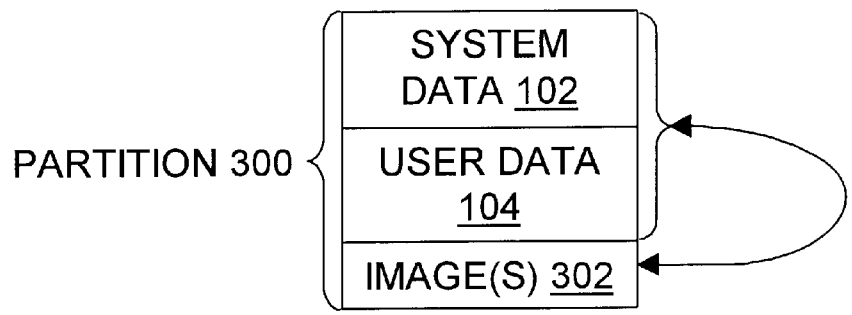
FIG. 3 is a diagram illustrating an approach according to the present invention, which copies user data and file system data in at least one direction between an imaged partition and an image stored in that partition.

The present invention relates to computer systems, methods, and configured storage media for storing images onto an imaged partition and for later recovering the images, that is, using them to restore imaged data. The invention is illustrated generally in FIG. 3. Unlike the conventional imaged partition 100 of FIG. 2, the novel imaged partition 300 includes one or more images 302 of data 102, 104 from the imaged partition 300. The images 302 are created using sector-by-sector or cluster-by-cluster imaging tools and techniques, which may be those already known or those hereafter developed. However, some embodiments allow users to select specific subdirectories and/or specific files when creating or restoring an image 302.

The problem of consumer confusion between the size of a bootable partition and the size of a disk is avoided, because a separate partition is not needed to hold the image. The bootable partition seen by the user is substantially the same size as the disk. A small separate partition may be used, in some embodiments, to hold information used to locate the image(s) in the imaged partition 300 after system data 102 is damaged. But even in this case consumer confusion is unlikely because the difference in the size of the bootable partition 300 with the separate partition and the size without the separate partition is at most a few megabytes (minimum partition sizes are imposed by file system and other system constraints). Thus, on a typical disk of gigabyte or greater capacity the bootable partition 300 can be made sufficiently close in size to the size of the entire disk to alleviate consumer concerns.

Operating Systems and File Systems Generally

Each partition 300 resides on a computer using at least one specific type of operating system, and each partition 300 may have its own type of file system. The present invention is illustrated mainly by reference to MS-DOS or Windows operating systems and FAT or Windows NT file systems. However, those of skill in the art will appreciate that the scope of the present invention comprises the creation and/or use of images 302 stored in imaged partitions 300 using a UNIX-like file system (namely, Linux, BSD, System V, SunOS, and/or other UNIX file systems), or operating systems and file systems of various other types.

To allow creation of an image 302, the operating system must allow exclusive file access, or else be able to defer to another operating system that itself allows exclusive file access. This can be accomplished by an operating system that maintains a single-threaded environment or by one that provides filesystem locking and hence allows exclusive access. For example, the MSDOS operating system provides exclusive file access because it is a single-threaded environment, at least from an application program's perspective. One could also use a Linux (or another UNIX-like) operating system and utilize system locks to provide for exclusive access. While the Windows (currently Windows 95, 98, NT and Windows 2000) operating systems are multi-threaded, they can defer to MS-DOS, Linux or another single-threaded environment. An implementing program according to the invention can begin execution in these multi-threaded environments and then pass control to a portion that runs in DOS or Linux mode and thus provides exclusive file access. Some operating systems also provide locks that ensure exclusive file access, or provide exclusive access at subsystem load time before caching and virtual memory are enabled, so deferral to another (single-threaded) operating system is not needed.

FAT and NTFS File System Examples

Figure 4:
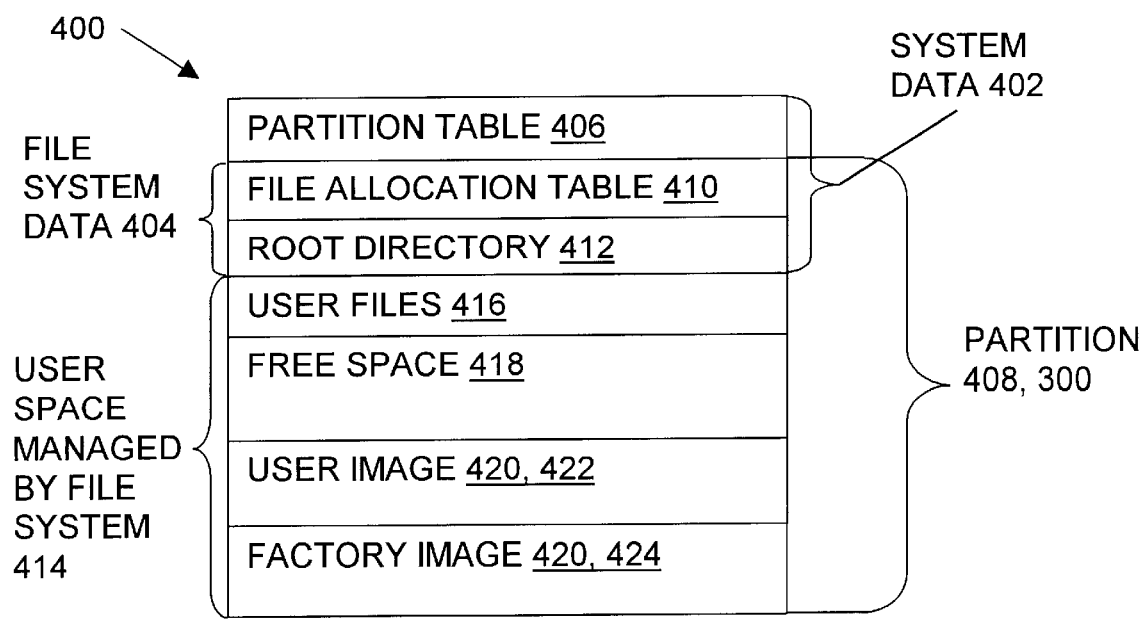
FIG. 4 is a diagram illustrating an imaged partition which uses a FAT file system and is configured according to the invention.

FIG. 4 illustrates a computer configuration, indicated generally at 400, according to the present invention in a computer utilizing a FAT file system. FAT file systems include, without limitation, FAT-12, FAT-16, and FAT-32 file systems which employ a file allocation table ("FAT"—hence the name "FAT file system"). FAT file systems are well known.

Figure 5:
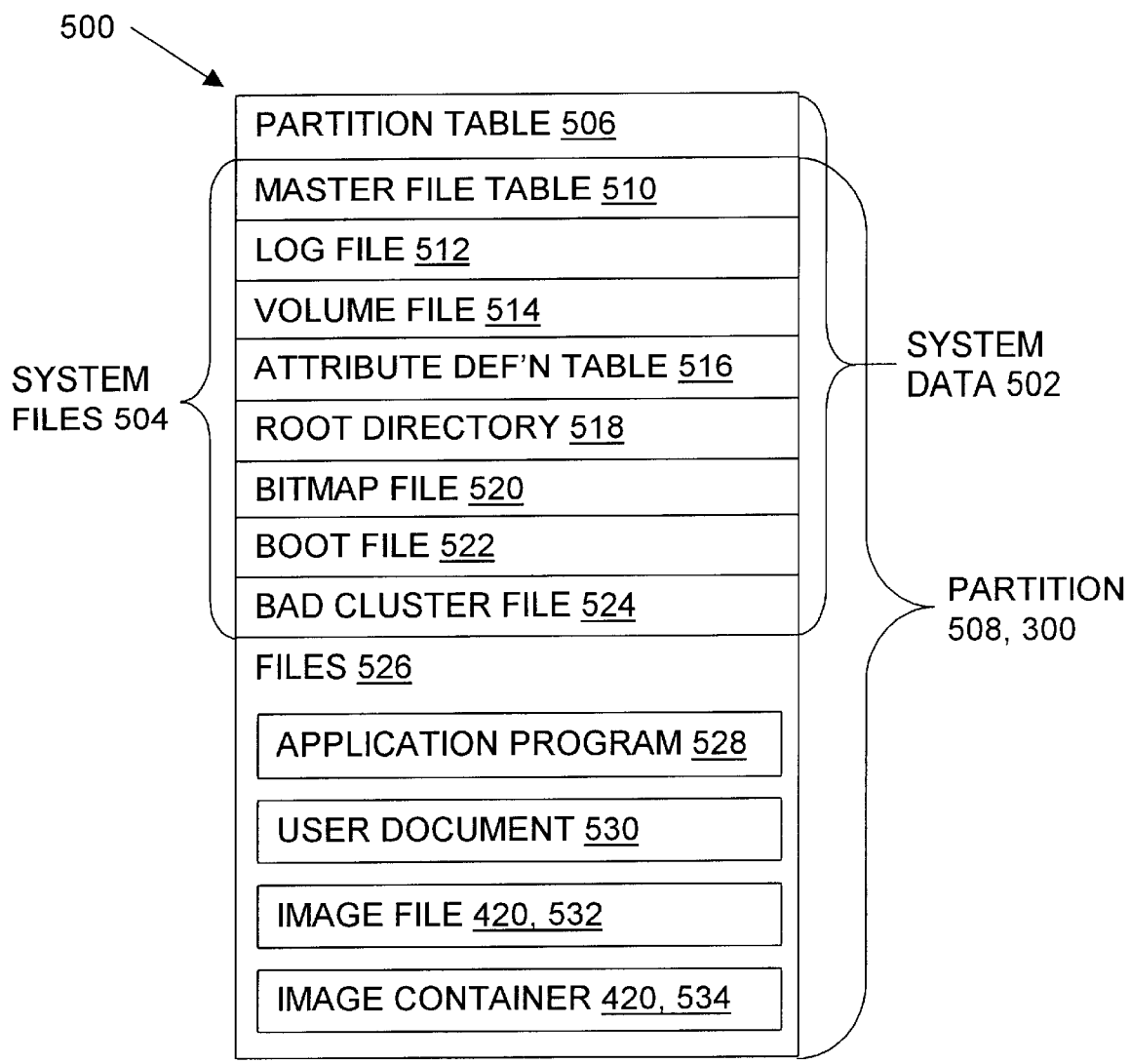
FIG. 5 is a diagram illustrating an imaged partition which uses an NTFS file system and is configured according to the invention.

FIG. 5 illustrates a computer configuration, indicated generally at 500, according to the present invention in a computer utilizing an NTFS file system. Discussions of NTFS are provided in "Inside the Windows NT File System", by Helen Custer, ISBN 1-55615-660-X, as well as in marketing and technical materials available in hard copy and on the Internet from Microsoft Corporation and other sources.

In the illustrated configurations 400, 500, and in other configurations according to the invention, some locations on disk are reserved in that they are used to control the basic operation of the computer, as opposed to controlling a specific application program or a specific operating system library. These special locations store certain types of system data 402, 502, and they are generally "hard-wired" into the computer system, in the sense that their disk locations are known at boot time. For instance, a Master Boot Record ("MBR") stored at a fixed location on the disk contains the "bootstrap" program that initially gets the computer up and running. System data 402, 502 may also be stored at locations which are not hard-wired. System data 402, 502, whether hard-wired or not, are generally familiar in the art. But the use and imaging of system data 402, 502 according to the present invention are novel.

System data 402, 502 include both data 404, 504 which is specific to a given file system and data such as the partition table 406, 506 which is not file-system-specific. The partition table 406, 506 for a given computer may be stored outside a given partition 408, 508. The file-system-specific system data 404, 504 are stored inside the partition 408, 508. As noted above, the partition tables 406, 506 define the partitions, while the file-system-specific system data 404, 504 define the files within the partition 408, 508.

In the illustrated FAT configuration 400, the file system data 404 includes at least a file allocation table 410 and a root directory 412. The file allocation table 410 contains entries for space which is allocated within a space 414 managed by the FAT file system; the file allocation table 410 entries specify which clusters are allocated to each file 416 in the managed space 414. The root directory 412 contains entries that describe the names and hierarchical position of file system directories, subdirectories, and files 416. The files 416 may include executable files, user-created files, special files used to run programs such as .dll files, sound files such as .wav files, and so on. Storage space not allocated to any file 416 is free space 418.

In the illustrated NTFS configuration 500, the file system data includes several system files 504. The system files 504 (also called "metadata files") serve roles in conventional systems that are well understood. However, one of the differences between FAT and NTFS configurations deserves repeating. As shown, FAT file systems make a strong distinction between a file system area 404 and a user data area 414. FAT file system structures, such as directories and disk allocation structures, are stored in the system area 404 while application programs, documents, and other user files are stored in the user data area 414. By contrast, NTFS stores all data in files, including not only user data such as application programs 528 or user-generated documents 530 but also file system data such as directories 518 and disk allocation structures (also referred to as bitmaps) 520.

Some configurations may mix system data and user data differently. In particular, some may blur the line between system data and user data, and some may treat a given piece of data as system data while others treat the same or analogous data as user data. Even in the FAT and NTFS configurations shown, classification problems may arise. For instance, one might ask whether registry information and system configuration information should be classified as system data or user data. However, an image 420 generally contains both system and user data rather than user data alone, to reduce or avoid the need to reinstall system information when recovering a partition with data from the image.

Image Types

The images 420 used according to this invention may be compressed, or not compressed, packed or not packed, and/or encrypted or unencrypted. Compression modifies system data 102 and/or user data 104 by replacing selected data elements with more compact representations through redundancy-removal techniques such as run-length encoding, data dictionary use, and the like. Packing removes some or all of the unused space in file allocation units, such as by omitting from an image 420 copies of entirely unused sectors at the end of a cluster. Encryption modifies data in order to keep the meaning of the data hidden from unauthorized persons. Those of skill in the computing arts understand how to use familiar tools and techniques to encrypt, compress, and/or pack an image 420 in the present context.

The images 420 may also be stored contiguously or non-contiguously. A contiguous image 420 is stored as a single block of data. By knowing the location of the initial sector and knowing either the length of the image 420 or the marker that signals the end of the image 420, an implementing program can read the entire image 420 by beginning at the first location and then continuing to read each sector until the end of the image 420. By contrast, a non-contiguous image 420 is stored in at least two, and possibly many more separate locations on the disk with non-image data and/or free space located between the pieces of the image 420. If the image 420 is stored as a non-contiguous file, then at least a portion of the file system data must be accessed to read the image 420 (although not necessarily by reading the same copy of file system data that is used by the operating system and applications during normal operation). The parts of the non-continuous image file can be accessed in the event of a file system failure. This access information can be provided in a specified location within the imaged partition, in the image container, or in a separate diagnostic and recovery partition.

For convenience, this discussion generally speaks of an image 420 which is stored in an imaged partition such as the partition 408 or 508 on a disk. However, the partition in question may hold several images 420. The partition and the image(s) 420 may be stored on several disks through fault tolerance measures. The storage medium may also be something other than a disk, such as a CD-ROM, chip memory, or other computer storage medium, including media developed hereafter but configured or utilized according to the present invention.

An image 420 may be either a user-generated image 422 or a factory-generated image 424. A user image 422 is an image of a machine's partition(s) generated after the machine has been delivered to the user. The user will often have added user data 104 and system data 102 to data placed on disk by the "factory" (i.e., by an OEM, system integrator, reseller and/or corporate Information Technology department or the like). For instance, the user may have installed additional programs. The user may also have removed data that was installed by the factory. Some embodiments of the invention permit user images 422 to be incrementally updated.

By contrast, a factory image 424 is an image of the data created by the manufacturer or other vendor/provider. A factory image 424 contains a copy of the machine's disk, including all factory installed software and system files, before the user starts to use the machine. Embodiments of the invention do not generally support incremental updates to a factory image.

An image 420 may be stored either as an image file 532 or within an image container 534. Containers 534 are used because, in some environments, there is an upper limit on file size which makes single files too small to hold desired images. For example, in some FAT file systems files cannot be larger than 2 GB. To store an image 420 that would be too large for a single file, the image 420 is divided into two or more pieces and each piece is stored in a file that does not exceed the maximum file size. The files that hold the image 420 collectively form the container 534. A given container may have no contiguity (noncontiguous files stored apart from each other), partial contiguity (contiguous files stored apart from each other), or full contiguity (contiguous files stored next to each other). In addition, an image container may contain more than one image. In one embodiment, the image container includes image files and additional control files; in other embodiments, image contents and control data are not necessarily stored in separate files. Within the control files are such things as an image Table of Contents (TOC), check codes, a copy of system data for the partition, and unique signature bytes for identification. If a container that holds two or more images is partially corrupted, but an image within the container is intact, then that image's signatures and/or checksums can be used to locate the image, to verify its intactness, and to allow restoration of the image. This may be done despite serious damage to the container holding the image and/or to other image(s) in the container.

By way of example, some embodiments use the following fully contiguous container format:
<End of Partition, End of Image Container>
File: toc_end.pqc
   Beginning TOC signature
      Container Signature bytes
      Offset to beginning of container
      Number of image directory entries
      Offsets from beginning of file for each image directory entry
      Major/minor format (this is the container format version X.Y)
      Unique Partition Signature, checksum and size of container
      Directory entry for image 1
         Image name
         Offset to image (if image is in container)
         Checksum of image
         Size of Image
         Size of image data
         Copy of system data and retrieval information for image (in case of partition damage or if image is not in the container)
         Creation date/time
      Directory entry for image 2
         Image name
         . . .
         Creation date/time
   End TOC signature
File: filename1.pqi (or multiple files if necessary)
   Image 1 Data (actual image file or files)
File: inter1.pqc (between each image, if three images, next file would be inter2.pqc)
   Inter-Image partial TOC (only a TOC entry for the next image)
   Inter Container Beginning PTOC Signature bytes
      PTOC Contents . . .
         Directory entry for image 2
            Directory contents (as in image 1 above)
   Inter Container End PTOC Signature bytes
File:filename2.pqi (or multiple files if necessary)
   Image 2 Data
File: toc_begin.pqc (redudant TOC, duplicate of End TOC)
   Beginning TOC signature
      TOC Contents . . .

End TOC signature
<Beginning of Image Container>

An image 420 may also be stored in a non-contiguous file or container. In some embodiments the block size is equal to or smaller than the smallest cluster expected. Generally 4K should be considered the smallest cluster, even though in some implementations, a cluster size as small as 2K may be assumed. In some embodiments every block contains the following header information:

- the file ID or unique image identifier which identifies which file the block belongs to
- the sequential ID which identifies each block's sequence number
- the checksum which is used to verify the contents of the block, and
- the image data.

The various image 420 characteristics just described may be combined in various ways. For instance, a FAT partition may hold a factory image stored in a contiguous container and an incremental user image stored in a non-contiguous file; an NTFS partition may hold factory and user images stored in contiguous and/or non-contiguous files and/or containers; images may be stored in HPFS or Linux partitions; and so on. Various internal container and file formats may also be used, with or without various familiar elements such as checksums, long file names, and the like.

One of the benefits of contiguity in images according to the invention is that data can sometimes be recovered even if there is a physical head crash. These crashes usually occur in the early sectors of a drive where the FAT table and other system data are often stored, while the image is stored in a rarely accessed part of the partition which is less likely to be damaged.

Another benefit is minimized data movement when the image is restored. If the image 420 is placed at a known location, such as the end of the partition 300, then even if FAT, NTFS, or other system information is lost, recovery may still be complete. The image 420 can be located by its position (for example, at either the beginning or the end of the partition 300), and if the image 420 hasn't been corrupted or damaged, it can then be read to restore data that would otherwise be lost.

Computer Systems Generally

Figure 6:
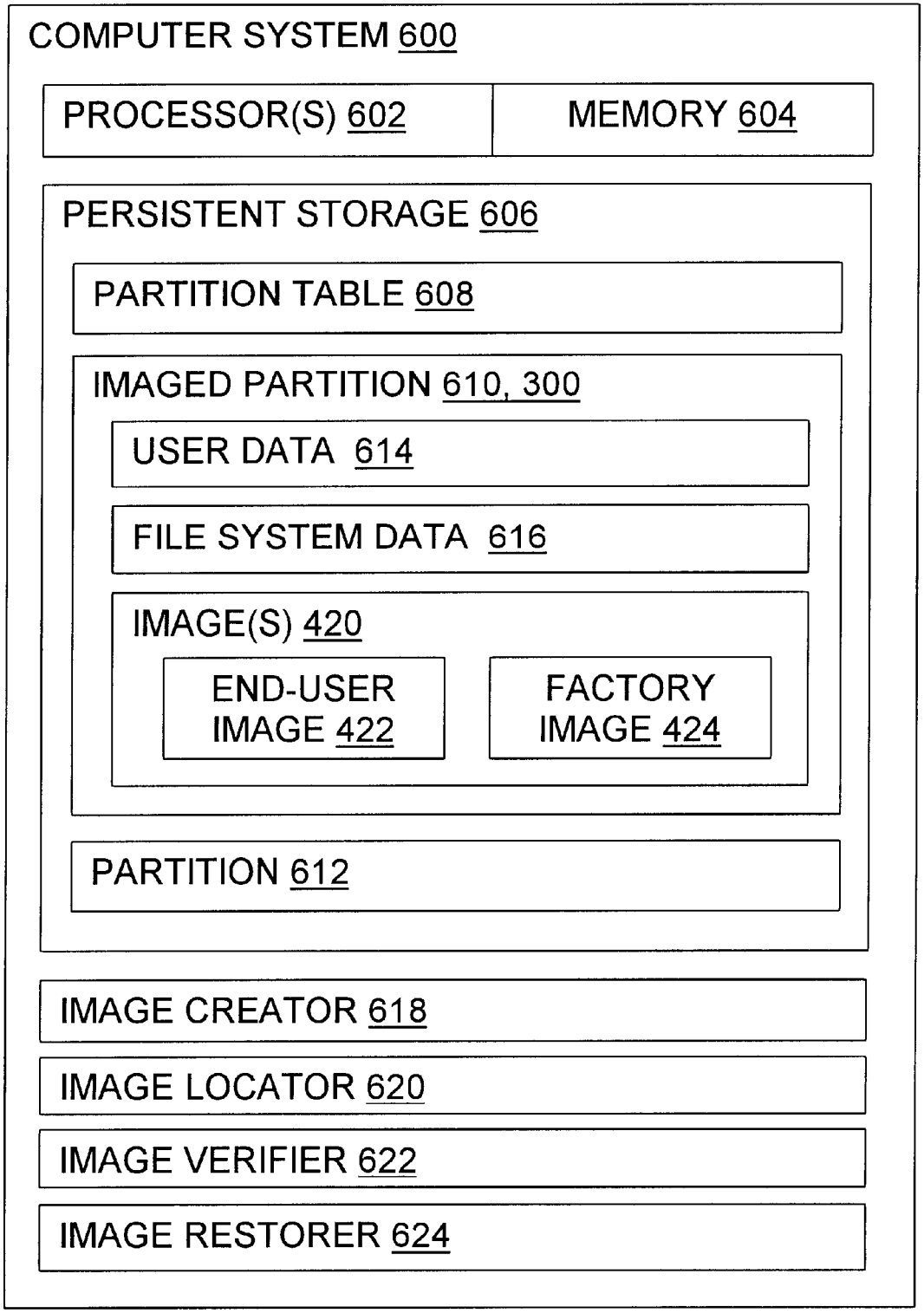
FIG. 6 is a diagram illustrating a computer system according to the invention.

FIG. 6 illustrates a computer system 600 according to the present invention. The system 600 contains at least one processor 602, internal memory 604 such as random access memory (RAM), and persistent storage 606. Suitable general or specific purpose processors 602, memories 604, persistent storage media 606, and supporting circuitry (e.g., buses, clocks, I/O) and software (e.g., device drivers, file systems, operating systems), including those commercially available and those yet to be developed, may be configured for in-partition images by persons of skill in the art according to the teachings herein.

A partition table 608, such as an IBM-compatible partition table of the type noted in the Technical Background, defines at least one partition 610 in the persistent storage 606. Other system data, such as boot record data, may also be present. As used herein, "data" includes spreadsheets, word processor output, graphics files, and other documents, as well as executable instructions such as machine language, microcode, assembly language instructions, portable byte codes, job control language, scripts, interpretable source code, object code, linked code, and/or combinations thereof.

The partition 610 will often be the only bootable primary partition on the system 600, but in some embodiments boot management software and multiple operating systems will be present, allowing a user of the system 600 to choose between several bootable partitions. In such cases, one or more of the bootable partitions may be configured for in-partition images according to the invention. It is possible, but not necessary, for every primary or logical partition on a given system to be configured with respective in-partition images.

In some embodiments a relatively small diagnostic and recovery partition 612 is also present and defined in the partition table 608. As explained below, this diagnostic and recovery partition 612 can be used for recovery if the imaged primary partition 610 is damaged. Because disk crashes, virus attacks, and similar trauma sometimes damage only the system data in the bootable primary partition 610, recovery can be facilitated by storing a copy of the system data and location information for retrieval of images 420 in the diagnostic and recovery partition 612.

The imaged partition 610 includes user data 614 and file system data 616. If the imaged partition 610 is a FAT partition as shown in FIG. 4, then the user data 614 and file system data 616 are organized as FAT user data 416 and FAT file system data 404. If the imaged partition 610 is an NTFS partition as shown in FIG. 5, then the user data 614 and file system data 616 are organized as NTFS user data 526 and NTFS file system data 502. When other file systems are used, the user data 614 and file system data 616 are organized accordingly.

The imaged partition 610 also includes at least one image 420 containing a copy of at least some of the user data 614. Note that even though the same data thus appears in at least two places in the partition 610, the data 614 outside the image 420 is directly usable by conventional operating system and/or applications software while the copy in the image 420 is not. User data 614 outside the image 420 is directly accessible to the operating system or application programs, through the file system, because it is stored in a format assumed by that conventional operating system software. By contrast, the copy within the image 420 is stored by a program implementing the invention in an internal format unknown to most or all file systems, operating systems, and conventional applications. For instance, the copy of user data inside the image will generally be compressed, packed, and/or encrypted, making the data unusable by most software until the implementing program decompresses, unpacks, and/or decrypts the data, and lays it back down in a conventional file system format.

Note that in some cases the only copy of particular user data will be in the image 420. For instance, the following sequence of events might occur. The vendor installs the operating system and applications in the partition 610. The vendor also creates an image 424 of the partition 610 and stores the factory image 424 in the partition 610. The user receives the system 600 and begins using it. Then some user data 614 is lost through a virus attack, user error, overwriting during installation of other software, or another event. At this point, the only copy of the lost data in the partition 610 is the copy in the factory image 424. Similarly, the only copy of certain user data at a given point in time might be the copy in a user-generated image 422. In short, the images 420 are not "in-partition images" simply because they are images of some partition stored in some partition. Nor are they in-partition images because they (may) contain a copy of user data which is stored in standard file system format elsewhere in the partition containing the image.

Rather, an image 420 is an in-partition image at least because it contains user data which came, at some point in time, from the partition 300 that currently contains the image 420. In some embodiments, an in-partition image 420 is an image which is created from a partition and then stored in that partition without any intermediate storage in another partition or on another persistent storage medium.

If there are two or more images 420 in the imaged partition 610, then the images 420 may include a factory image 424 and one or more end-user images 422. The configuration with one end-user image 422 and one factory image 424 shown in FIG. 6 is just one example of the many possible embodiments.

Image Creator

The illustrated system 600 also includes an image creator 618. Image creation generally is well-known in the art, and may be readily adapted for use with in-partition images through application of the teachings presented herein. In one embodiment, the image creator 618 initially creates each image 420 but does not update previously created images 420. In another embodiment, the image creator 618 also updates end-user images 422. A user-defined portion of the image 422 can be selectively updated, or a predefined set of user files within the image could be updated. The specific system and user files to be updated could also be defined at the factory when the update is automated, so that the specified data is updated by imaging it after predefined events and/or at predefined times.

In one embodiment, the image creator 618 creates only factory images 424. In another embodiment, the image creator 618 creates only end-user images 422. In other embodiments, the same image creator 618 creates both factory images 424 and end-user images 422.

The images 420 can be stored in various ways. For instance, images 420 may be stored contiguously either as a file with adjacent clusters or as a container whose multiple contiguous files are stored adjacent to one another. Images 420 can also be stored non-contiguously, in the sense that the file(s) used has non-adjacent clusters (or sectors) and/or in the sense that image files in an image container are not adjacent.

Sectors, clusters, and larger image 420 components may be grouped in various ways. The image 420 may be stored as a file, or in a container whose files have some common characteristic such as an extension name or use of another file naming convention. All components of an image could also be stored in the same subdirectory.

If the image 420 is stored as a single contiguous block, then care should be taken to prevent fragmentation by utilities such as defragmentation tools and/or partition manipulation tools. The image file(s) could fragment if a utility attempts to place all of the free space in a contiguous block. Some utilities will slice up one or more large image files and place their pieces into the holes near one end of the partition, particularly if the partition that holds the image 420 is resized smaller. If the image 420 is fragmented then some implementing programs will report an error and fail when data recovery using the image 420 is attempted. Other implementing programs merely prefer contiguous images 420; although data recovery using the fragmented image 420 takes longer, it is still possible with such programs.

When images are fragmented, some mechanism must be used to link the fragments together in the proper sequence. This mechanism may include the file system data for the image file(s) involved, and may include file naming conventions for sequencing files in an image container. In alternative embodiments, sequence numbers and/or pointers (sector or cluster addresses) are embedded in the image 420 itself This embedding approach has the disadvantage that it is not compatible with widely used image formats such as the PowerQuest Drive Image® image container format. Yet another embodiment might place such retrieval information in the diagnostic and recovery partition, a specific location on the disk, or in the image container.

The images 420 may be stored in predefined locations within the partition 300, with one preferred location being at the end of the partition 300. If this location is used, the image 420 will be easier to find after a disk crash. For instance, suppose the FAT or Master File Table has been badly damaged, but the end of the partition 300 can be located, the image 420 is stored contiguously at the end of the partition 300, and the front of the image 420 is marked with a beginning signature value. Then the image 420 can be located by searching backward from the end of the partition until the front of the image 420 is located. If the partition table 608 has been destroyed and the end of the partition 300 is thus unknown, the search can start at the end of the disk or other storage device 606 and work backwards until the front of the image 420 is located. The image 420 can then be used to restore the lost partition 300, either to the same storage device 606 if that device still functions, or to another storage medium if necessary. The image could also be placed in a image container and found by searching for the container signatures.

Image Locator

Image 420 creation and image 420 location are closely related. For convenience, FIG. 6 shows an image locator 620 separate from the image creator 618, but the creation and location functions could be performed with overlapping or interwoven code in a given implementing program. The image locator 620 is used to locate one or more images 420 for data recovery, image updating, image deletion, image defragmentation, and similar operations pertinent to in-partition images. If multiple images 420 are found, the user can choose the image 420 desired, or the image 420 to operate on can be automatically chosen by creation date, name, or some other defining feature. For example, a partition 300 may contain both a factory image 424 and an end-user image 422. To restore data placed on the computer 600 after the purchase, the end-user image 422 would be chosen (unless it is incremental with respect to the factory image 424, in which case the factory image 424 would be used first and then the incremental end-user image 422 would be used).

When the partition table 608 and/or the file system data 616 that would otherwise be used to locate an image 420 have been damaged, the image locator 620 can be used to determine where the image 420 was stored within the damaged partition 610. If the image 420 was not stored as a contiguous image, recovery will be facilitated if a FAT cluster chain or equivalent structure can be found (MFT runs in NTFS or inode information in UNIX-like file systems); if the image 420 was stored in a container then directory information will also be used. As noted, the cluster chain and directory information is normally stored in file system data, but this retrieval information may be alternatively or additionally stored inside the image 420 itself if compatibility with the existing Drive Image® format is not required. If compatibility is required, this retrieval information may be stored in the image container or the diagnostic and recovery partition. If an image cannot be found or recovered, because the media is irreparably damaged, because the user has deleted the image file(s) intentionally or inadvertently, or for other reasons, then an error is returned, the user is informed, and, in some implementations, the program exits.

One way to implement the image locator 620 is to store portions of the system data in a known, fixed location within the imaged partition 300. The copied system data can be located, after the normal system data has been lost, by moving the disk head to the fixed location in question. This location would normally be marked as system, hidden, and read-only so it is not easily accessible to the end-user and is not easily deleted or overwritten. Another implementation stores the system data needed for image recovery outside the imaged partition 300 in a diagnostic and recovery partition 612. Yet another implementation, or a system that could also use one of the approaches already mentioned, backs up the necessary system data as recovery information onto a removable medium, such as a Zip drive, a Jaz drive, a WORM drive, a floppy (or floppies), a tape drive, and so on.

In short, the system 600 saves necessary system data such as the partition table, boot record, root directory, and file allocation table (for FAT systems), Master File Table entries (for NTFS systems), boot block, super block, bitmap and inode information (for UNIX-like systems) or equivalent structures in other file systems. Thus, the system 600 is able to restore a desired image 420 when the partition table is damaged, when the boot record is damaged, when the file allocation table is damaged, when the Master File Table is damaged, when the boot block, superblock, bitmap or inode information is damaged and when equivalent structures in other file systems are damaged. Sometimes an image cannot be found, because of damaged media or for other reasons, even using all of the backup procedures. In this case, an error is returned, the user is informed, and the program exits.

Image Verifier

An image verifier 622 confirms that the image 420 has not been corrupted. In many embodiments, great care is taken by the image verifier 622 to detect inconsistencies in the file system data 616 before an image 420 is created or updated, in the file system data 616 after an image 420 is created or updated, in the image 420 itself after it is created or updated, and in the image 420 before and after it has been used to restore user data.

Images 420 may be modified in various ways, so the image verifier 622 should perform checks at each point where a critical assumption about the file system and/or image data might be incorrect. For instance, the user may create and restore an image 420 using various products, including the PowerQuest® Drive Image® product. If the image 420 is stored as a file accessible through the file system, the image 420 may be moved. A partition 300 holding one or more inpartition images may be resized or moved, thereby moving or fragmenting the image(s). In such cases, the software implementing in-partition images must be notified of the changes or must itself detect them.

The specific tests performed by the image verifier 622 depend in part on which file system is associated with the partition 300. Thus, for a FAT file system, integrity is tested by searching for lost clusters, illegal values in the boot sector, or inconsistencies between copies of the file allocation table (if multiple copies are present). In general, the image verifier 622 includes checks such as those made by the well-known utilities CHKDSK and SCANDISK, as well as checks on images such as those made by PowerQuest Drive Image® or other imaging tools. The image verifier 622 may also check for image 420 fragmentation and/or movement. As with the other implementing program components, functions of the image verifier 622 could be performed in a given implementing program with code that overlaps or is interwoven with the code for other components, such as the image creator 618, image locator 620, or image restorer 624.

The image verifier 622 may also check the integrity of the contents of an image file by utilizing error checking techniques such as checksums, cyclic redundancy checks or other means known to the art. If errors or other exceptional conditions are detected by the image verifier 622 in any of its verifications, then appropriate measures are taken. If an error is discovered the verifier 622 may simply report the error, may attempt to fix the error by itself, or may attempt to use the image locator 620 and/or image restorer 624 to fix the error. In the case of a fatal error, conditions on the disk 606 that were changed by the implementing program are restored to the extent possible, a message may be passed to the end user (before or after the conditions are restored), and the implementing program is terminated.

When a diagnostic and recovery partition is used to store system data and image location retrieval information, in the event of disruption of the system and/or partition files, then during the startup routine the location of the factory and end-user in-partition images should be verified, and fixed if necessary, within the diagnostic and recovery partition. The partition and/or its images could have been moved or resized or otherwise altered by a partition-manipulating tool. In such a situation, the diagnostic and recovery partition should be updated as soon as possible, such as at system boot or start-up time.

Image Restorer

The illustrated system 600 also includes an image restorer 624 which uses a selected image 420 to restore the partition 610 to the state it was in when the image 420 was created. In some implementations, the image restorer 624 will restore the user data to target locations inside the same partition 610 that contains the image 420. In other implementations, the image restorer 624 is able to restore the image 420 to another location, such as another partition on the same machine, another partition on a physically different machine (e.g., over a network connection), or a removable medium.

If a single partition 300 which stores images 420 as files contains both a factory image 424 and a user image 422, when the image restorer 624 restores the factory image 424 it will typically overwrite the user image 422. The user image 422 was not on the partition 300 when the factory image 424 was created, and so the user image 422 will not be restored. On the other hand, if the user image 422 was made while the partition 300 contained the factory image 424 then a restoration from the user image 422 it will not lose the contents of the factory image 424. An image that is stored in the partition may be overwritten during a restore to the partition. If the image is not part of the image being restored, an option must be chosen as to retain the image or not. The default should be to retain the image. If the image is retained, the directory and allocation information must be modified after the image is restored so that it remains allocated and in the file system directory structure. An image that is stored in the partition may be included in an image being made of the partition if the image is not in a container.

As noted above, when the system data such as system data 402, 502 has been damaged, the image locator 620 and the image restorer 624 can cooperate to locate and restore an image 420 from an image file or container 420. The image locator 620 finds the location of the image 420 within the partition 300, and the image restorer 624 uses the image 420 to restore the imaged data back onto the partition 300.

Methods Generally

Figure 7:
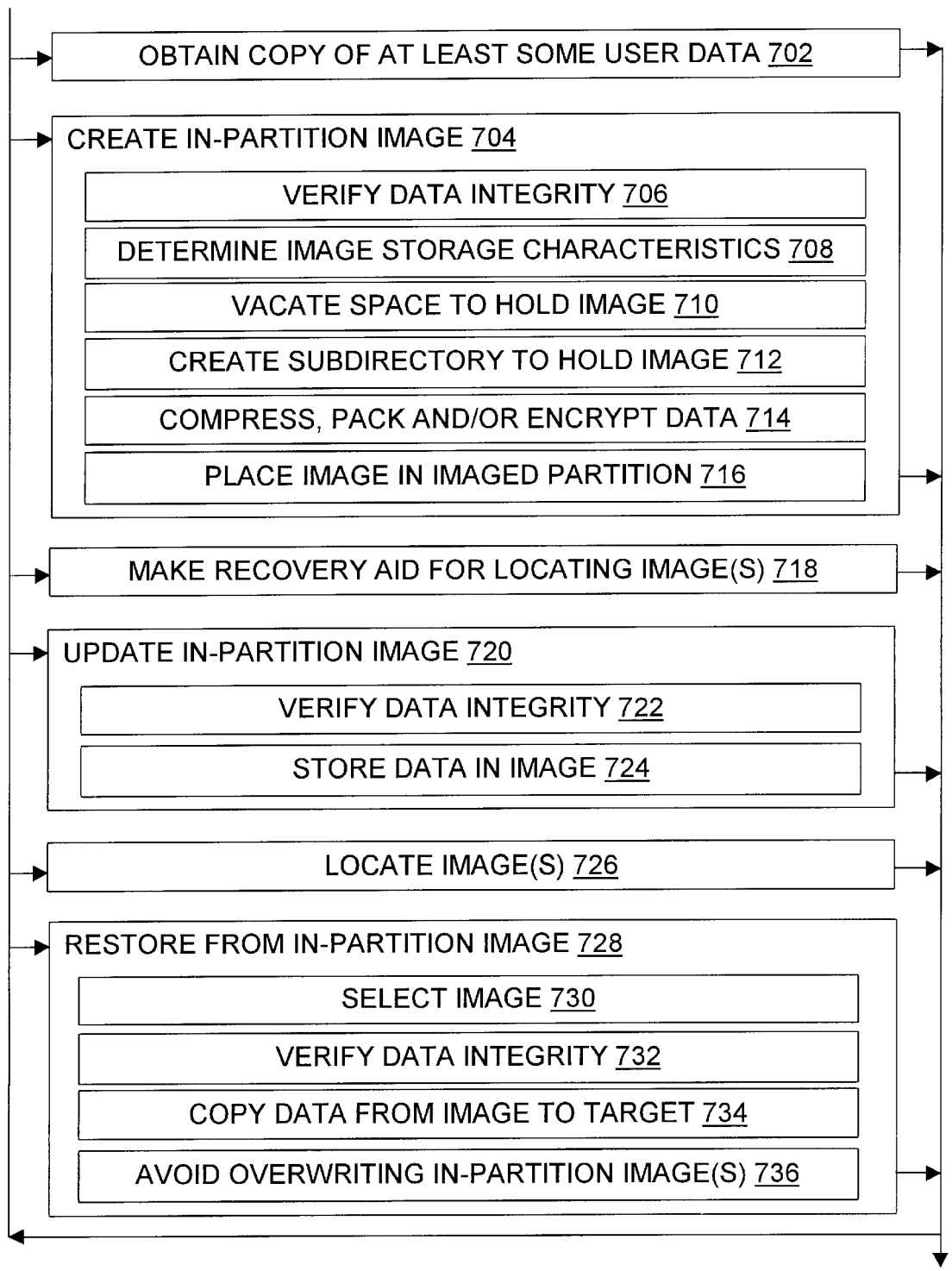
FIG. 7 is a flowchart illustrating methods according to the invention.

FIG. 7 illustrates methods of the present invention utilizing images 420 of an imaged partition 300 within that partition 300. Aspects of these methods have already been discussed in connection with the system 600. Unless clearly indicated otherwise, the discussion of these methods applies to systems, storage media, and signals according to the invention, and the discussions of systems, storage media, and signals also apply to the inventive methods.

During an obtaining step 702, an implementing program obtains a copy of user data which is stored in the partition 300. This may include all of the user data 614 or it may include selected user data, such as selected files and/or subdirectories. Familiar file and subdirectory selection tools and techniques such as wild cards, dialog boxes, and the like may be used. The obtaining step 702 may read user data directly from the partition 300, using standard file system file-oriented calls or (preferably) lower level sector/cluster-oriented routines. Tools and techniques for accessing user data without going through the file system are well known in the art. Instead of reading user data from locations organized by the file system, the obtaining step 702 may read a copy of user data from a previously created image 420 of the partition 300. For instance, one could select an image, identify files or subdirectories that were stored in that image but will not be stored in a new image, and then create the new image.

During a creating step 704, the system creates an in-partition image 420 by at least storing a copy of at least a portion of the user data from the partition 300 in at least one image 420 in the same partition 300. The storing step within the creating step 704 includes at least an explicit placing step 716 and an implicit or explicit determining step 708, and optionally includes one or more of a verifying step 706, a vacating step 710, a subdirectory creating step 712, and a data preparing step 714. Which steps are required depends on the appended claims, as they are understood by those of skill in the art. It will also be appreciated that these steps, like others described herein, may generally be performed in various orders or concurrently, may be repeated, and may be renamed or grouped differently in different embodiments. Each of these steps will now be discussed in turn.

The verifying step 706 verifies the integrity of the file system data which organizes the user data being placed in the image 420. Note that FIG. 7 shows two additional verifying steps, identified as 722 and 732. The three verifying steps perform the same general task, which is to detect inconsistencies in the data on which the system 600 relies and correct them or otherwise prevent image utilization based on the inconsistencies. Each of the verifying steps 706, 722, 732 may use routines or data structures in the image verifier 622 that are also used by one or both of the other verifying steps.

However, the type of data being verified depends on the context. Thus, the verifying step 706 verifies file system data 616 to avoid creation of a corrupt image during image creating step 704. The verifying step 722 verifies both file system data 616 and the contents of an image 420 to avoid corruption of the image during an image updating step 720; the inputs to the update include both the current version of the image 420 and the user data organized by the file system data 616. The verifying step 732 verifies the contents of an image 420 to avoid laying down a corrupt image during a restoring step 728.

The determining step 708 determines image storage characteristics. The determination may be implicit by virtue of being hard-coded in the implementing program, or it may be explicit by virtue of being subject to a configuration file, user selection, or other parameter. The storage characteristics determined include whether storage is in an image file 532 or an image container 534, whether the image 420 is a factory image 424 or a user image 422, and the degree of contiguousness within the image 420.

If the image 420 is stored at the end of a partition, the vacating step 710 relocates allocated sectors or clusters to make room for the image 420. If the image is being placed in an image container, the container contents may need to be moved and/or modified. As noted, this space may be located at one end of the partition to aid the image locator 620. If file system data is kept at one end of the partition, as in FAT partitions, then the image(s) 420 are placed at the opposite end of the partition. Tools and techniques for relocating portions of a file without destroying user data are known in the art.

The subdirectory creating step creates a system and/or hidden subdirectory dedicated to holding image(s) 420 or the image container 534 and having a special name readily identified by the implementing program. Placing all images 420 in such a subdirectory makes it easier during step 736 to avoid overwriting the image(s) 420 which are stored in the partition 300 when the data from an image 420 is laid down on top of existing partition 300 contents during the restoring step 728.

The data preparing step 714 compresses, packs, and/or encrypts the user data which is being imaged. These actions are discussed above in connection with the image creator 618.

The placing step 716 places the user data in the image, with the determined characteristics, in the vacated space and/or hidden subdirectory, after verification and data preparation. The specific act of creating an image 420 may be done with familiar tools and techniques, but the use of those tools and techniques for in-partition images is novel.

The image 420 must be created when the computer has been put into a state that allows exclusive disk 606 access. This prevents inconsistencies in the data (modification during the imaging process) and helps ensure that system information such as the Microsoft Windows registry are closed (or inaccessible to any other process, for example if running under a variant of the UNIX operating system) and so can be imaged. Some operating systems provide a lock guaranteeing exclusive disk 606 access. On some systems, the implementing program can be run after rebooting to a single-threaded operating system such as MS-DOS. On Systems running Windows NT or Windows 2000, the implementing program can be run at subsystem load time before virtual memory and multiprocessing subsystems are running. On systems running a variant of UNIX, the implementing program can be run in single user (root only login) mode.

A recovery aid making step 718 creates a copy of necessary portions of system data on a removable or other medium which can then be used by the image locator 620 as discussed above to locate the image(s) 420 if some or all of the system data is lost. The recovery aid medium could be a diskette, a writable CD, a Zip drive, a tape drive, a remote or alternate disk, or another medium which does not contain the partition 300 that holds the day-to-day working copy of the system data. Note that a recovery aid such as a "rescue diskette" does not itself necessarily contain any images 420. Rather, it assists the system 600 in locating in-partition images 420 located on some medium other than the recovery aid medium.

The recovery aid should hold a subset of the partition system data that allows the image 420 stored within the partition 300 to be recovered. Which system files or other data should be saved on the recovery aid depends both on the file system involved and the nature of the image 420. For instance, if the image 420 is stored in a non-contiguous file and the file system environment is FAT 12, FAT16 or FAT32, then copies of the MBR, boot sector(s) and extensions, FAT and the root directory of the partition 300 should be stored on the recovery aid medium. If some other file system is used, then the equivalent of these file system structures should be stored. If the image 420 is stored in a contiguous file, then the boot sector (and its offset from the beginning of the drive), and root directory (and its offset from the beginning of the partition) of the partition 300 or equivalent system data should be stored. If the image 420 is stored contiguously at the end of the partition 300 then only enough information to locate the partition 300 end is stored. If the image 420 is stored non-contiguously then the method used to store the image 420 should be known to the program that reads the recovery aid copy of the system data. This method may be similar to that used in a FAT table, or it may be a size and a list of offsets, or some other method might be used to link the non-contiguous pieces of the image 420. As an alternative, block sequence numbers along with unique image signature can be placed in the image file(s). The recovery process would then link up all blocks of the image 420 in sequence order to regenerate a complete image.

During the updating image step 720, an image 420 previously created can be updated to reflect changes such as changes in the user data (content and/or placement), the partition 300 size, and changes in system data (content and/or placement). In some implementations, a portion of an image 420 may be updated, with the user selecting which files or subdirectories to update, or a predefined list of data may automatically be selected for updating. In other implementations, the entire partition 300 is automatically copied over the image 420 being updated.

During the verifying step 722 the reliability of the data to be imaged is checked. The image 420 being updated may be verified at least before the update, after the update, or at both times. Likewise, the other verifying steps may be performed before, after, or both before and after the image utilizing steps 716 and 734.

A locating step 726 locates one or more images 420 which may subsequently be updated during step 720 or used for restoration during step 728. Image 420 location was discussed above in connection with the image locator 620.

An image 420 is restored during the restoring step 728. If multiple images 420 of the partition 300 are stored in the partition 300, the implementing program or a user selects a particular image 420 to be restored during a selecting step 730. For instance, the most recent user-generated image 422 could be the default selection when several images 420 are present. The verifying step 732 proceeds as discussed above.

Figure 1:
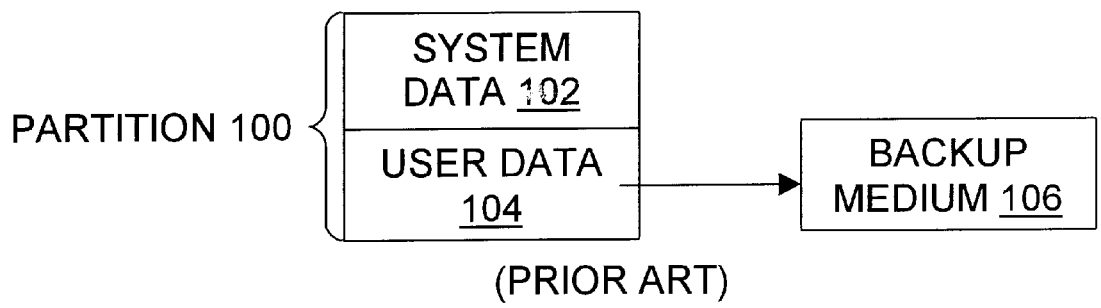
FIG. 1 is a diagram illustrating a conventional file-oriented backup approach which copies user data from a partition to a different medium.

The copying step 734 proceeds generally as in standard image restoration tools, so restoring the image will also restore any damaged system files, lost device drivers, and like data which is not protected by the approach illustrated in FIG. 1. In some embodiments the copying step 734 is coordinated with an avoiding step 736 to prevent image restoration from overwriting images 420 stored in the target partition 300.

Additional Implementation Notes

Image Creation

One embodiment of the invention creates and writes images to a contiguous file in the PowerQuest image container format and places the image container 534 at one end of the partition 300. The PowerQuest Drive Image® utility also uses this image container format. The .pqi and .pqc files forming the image container 534 may reside in a subdirectory which is marked with the system, hidden, and read-only directory attributes. This helps prevent image files and image containers from accidentally being modified by the user.

A factory image 424 will normally be created by the vendor at about the same time the original operating system and disk are installed in the computer. A factory image usually cannot be updated by the user, but some embodiments allow factory image updates.

When creating or updating an image 420 the storage size of the completed image 420 is first estimated. In one implementation, a bitmap which tells the state of each cluster (including at least an indication of whether a given cluster is in use) is created using the file allocation table or its equivalent. The number of used clusters is then multiplied by the cluster size to approximate the image 420 size. If compression is to be used, then conservative compression estimates should also be considered during the estimation. Methods of creating a bitmap of used sectors or clusters are known by those of skill in the art; if the NTFS file system is being used, the existing bitmap 520 can be used.

The estimated space needed for the image 420 at the end of the partition 300 is then vacated to make enough room for the image 420 to be stored contiguously. The image 420 will often be larger than the maximum file size, which is 2 GB on many systems 600. Accordingly, an image container 420 is used to hold the image contents.

In one implementation, the container includes a first file named filename.pqi, with "filename" specified by the user, and subsequent files in the container 534 have sequential numbers for the extension, with the same filename. For instance, if the user named the image 420 "MyImage" and three files were needed to store the image 420, then the files in the container would be named MyImage.pqi, MyImage.001, and MyImage.002. Other naming conventions may also be used. In addition, the container may include some control files to aid in recovery consisting of toc_begin.pqc, image files, inter<n>.pqc files between image files, and a toc_end.pqc file at the end of the container. The contents of these files have been discussed above.

When a subdirectory dedicated to images 420 does not exist, one is made using standard file system directory creation and attribute-setting calls, or their equivalent in terms of direct manipulation of file system data. If space for the dedicated subdirectory is not at the end of the partition 300, then the data stored there can be vacated to make room for the subdirectory of images 420. Alternatively, if enough contiguous space is not available, the user may be informed that there is insufficient space and the program exits or the image 420 is stored non-contiguously.

The bitmap generation is modified to exclude both the image 420 that will be created and its file structure, as the image 420 is generally not stored within itself. If the NT file system or another file system that provides a bitmap automatically is being used, the copy of the bitmap file 520 is altered. Depending on how the image 420 is stored, this may involve including or excluding a single file (if the image 420 is stored in a single file), an entire subdirectory (if the image 420 is stored in a single subdirectory), or a list of files (if the image 420 is stored as a series of files in a container). The modified bitmap indicates which clusters or sectors are free and which are allocated in the partition 300 outside of the image 420. The image files themselves are listed as unallocated space to avoid imaging them.

After creation of an image 420, directory entries in the root directory or equivalent file system structure should be updated to reflect the new image 420 including the image's file(s) and/or subdirectory. The FAT 410 or equivalent structure is also updated.

To optimize disk head movement, image files can be allocated in reverse cluster order based on reasonable block size. All cluster allocations should, if possible, be made in memory so the FAT 410 or equivalent structure(s) can be flushed to disk 606 after the image has been built. Internal storage of block location varies by implementation, but locations may be stored in the bitmap or in a run list.

Image Restoration

To begin restoration, one implementing program checks to see if the system 600 is bootable, by virtue of a bootable hard drive partition, a bootable floppy, or downloadable operating system available over a network, for instance. If it is, the implementing program tries to locate (image locator 620) at least one image 420. If no image 420 is found, the program returns an error. If more than one image 420 is found, the program returns the names of all images. All operations should be designed to be halted between any of the steps without causing damage to the image 420.

If the system is not bootable from a bootable hard drive partition, then the restoration involves booting from a rescue diskette that contains the boot files and a recovery application. If critical system data is intact, then image recovery proceeds. Critical system data generally includes the partition table, the boot record, the FAT or equivalent, and the directory.

A more difficult situation exists when the system data on the persistent storage 606 is damaged. This occurs when the partition table is damaged, the boot record is damaged, the drive has been reformatted, the FAT is damaged, and/or the root directory is damaged. One implementation recovers data by enabling a key instruction sequence at start-up that will look for a boot-up sequence to automatically boot the machine and start the recovery process. For this to occur, the "rescue diskette" executable code and the restore application should previously have been placed at a known location on the partition 606.

Another method for catastrophic disk recovery is to place key partition files such as image file names, locations, and other key information in a diagnostic and recovery partition 612. This diagnostic and recovery partition 612 may be a "one cylinder" primary partition which contains the file names, run lists, checksums, cluster run information, and other information required for recovery. If diagnostic and recovery partition 612 is used, a check should be performed (when booting or otherwise) to ensure that the image locations are synchronized with the diagnostic and recovery partition 612 information. Furthermore, checksum information should be stored in the .pqi file(s) for verification during disaster recovery. Using this method, images 420 can be restored even after a partition table has been modified with the FDISK tool, and even when partition system information stored in the partition table, the boot record, the FAT or Master File Table, and/or the root directory has been damaged. Of course, physical damage to the storage medium 606 itself may prevent recovery even when the diagnostic and recovery partition 612 is used.

Once the location of the image 420 is known, the data integrity should be verified; if problems are discovered, then the user is notified, and the process will end. Otherwise, one implementation then compares a bitmap stored in the image 420 with the bitmap that contains the .pqi files to ensure that the restore operation will not overwrite the existing image (.pqi) files. One implementation saves in memory all image file system information, such as cluster chains and directory entries, and then adds that file system information to the restored image, thereby ensuring that the image(s) are known to the file system in the partition 300 after the restore. The size of the current partition 300 is checked to ensure that it is large enough to hold the restored image 420. If the partition 300 is too small, the restore should not be performed.

Next, the image 420 is used to restore the original partition information. The image 420 itself is not stored within the image 420, and so the copy of the image 420 on the medium 606 should be protected as discussed above while the image contents are being written to that medium 606 outside the on-disk image file or image container. The position of the image (.pqi) file(s) should be checked. If the image 420 is not contiguous and at the end of the partition 300, then the image may be moved to that contiguous location before the restore begins. If both a user image 422 and a factory image 424 exist, the factory image 424 may be the last one in the partition 300.

If the image 420 is stored in a contiguous file or container, then the factory image 424 may be created as a "master" image on a smaller drive and then cloned to a larger drive. For example, the image 420 may be created on a 4 Gb drive and then be cloned to a 20 Gb drive. The cloned image 420 in the larger, cloned partition will not necessarily be at the end of the partition. In some implementations, the cloned image 420 is then moved to the end of the partition; in others it is left in its original location.

If the image 420 is at the physical end of the drive 606 and is stored either as a file or as a series of files in a container, then at least some hardware disk replicators will duplicate the entire drive 606. If this is not desired, the image 420 can be stored closer to the front of the drive 606.

One implementation places the contiguous image at the end of the partition. This location is then marked. The implementation also creates a separate partition 612 which contains access and validity information for the image(s). For instance, this partition 612 may contain a file index giving the name(s) of the image file(s) and their physical location(s) on the disk, and the information as defined in the container file for signatures and checksums. Placing the image 420 as a contiguous block at the end of the partition 300 offers some protection in the event of a head crash, as crashes more commonly occur at the beginning of a partition. Likewise, a head crash is less likely to damage data in the partition 612 because the head is less frequently over that data.

A disadvantage is that the partition 612 counts as one of the four permitted primary partitions. This is an issue if the user wants to create multiple bootable partitions and reaches the four partition limit. For example, this may be an issue with LINUX and its use of swap partitions. However, to ameliorate this problem, LINUX (and other operating systems such as Windows NT) can boot from an extended partition.

An image 420 can be written as one or more files utilizing the file system structures. Thus, writing the image 420 to disk and allocating space for it is handled by the file system. If the file is fragmented, even if marked hidden/system, the file system itself handles all implementation details. It may be more difficult to recover the image 420 if the file system data is damaged, but this problem can be avoided by using a recovery aid, as discussed above. Extra care must also be taken to modify the imaging process so the image file itself is not imaged. Also, confusion may arise during recovery because of the existence of extraneous "old" blocks of data on the disk that previously belonged to other, currently invalid images, so care must be taken to ensure that the clusters read belong to the correct image. This is possible if the header information discussed above is implemented within the blocks.

SUMMARY

In summary, the present invention provides systems and methods for using an image of a partition within the partition being imaged. The image contents can be recovered in at least most cases even if the system files such as the File Allocation Table, NTFS run information, or UNIX inode information is lost through a drive failure, virus attack, user error, or other event.

Articles of manufacture within the scope of the present invention include a computer-readable storage medium in combination with the specific physical configuration of a substrate of the computer-readable storage medium. The substrate configuration represents data and instructions which cause the computers to operate in a specific and predefined manner as described herein. Suitable storage devices include floppy disks, hard disks, tape, CD-ROMs, DVD devices, RAM, and other media readable by one or more of the computers. Each such medium tangibly embodies a program, functions, and/or instructions that are executable by the machines to perform imaging and image usage steps with images that have been or are being stored in the imaged partition, substantially as described herein.

Although particular methods and embodying the present invention are expressly illustrated and described herein, it will be appreciated that system and configured storage medium embodiments may be formed according to the methods of the present invention. Unless otherwise expressly indicted, the descriptions herein of methods of the present invention therefore extend to corresponding systems and configured storage media, and the descriptions of systems and configured storage media of the present invention extend likewise to corresponding methods.

In addition, the method steps discussed may be performed in various orders, except in those cases in which the results of one step are required as input to another step. Likewise, steps may be omitted unless called for in issued claims, regardless of whether they are expressly described as optional in this Detailed Description. Steps may also be repeated, or combined, or named differently.

As used herein, terms such as "a" and "the" and item designations such as "image" are inclusive of one or more of the indicated item. In particular, in the claims a reference to an item means at least one such item is required. When exactly one item is intended, this document will state that requirement expressly.

The invention may be embodied in other specific forms without departing from its essential characteristics. The described embodiments are to be considered in all respects only as illustrative and not restrictive. Headings are for convenience only. The scope of the invention is, therefore, indicated by the appended claims rather than by the foregoing description. All changes which come within the meaning and range of equivalency of the claims are to be embraced within their scope.

What is claimed and desired to be secured by patent is:

1. A computer system comprising:
   a processor, a volatile memory in operable connection with the processor, and a persistent storage medium accessible to the processor;
   a partition stored in the persistent storage;
   user data stored in the partition;
   file system data stored in the partition; and
   at least one image which contains a copy of at least a portion of the user data, the image also being stored in the partition.

2. The system of claim 1, wherein the partition is defined by an IBM-compatible partition table.

3. The system of claim 1, wherein the image also contains a copy of at least a portion of the system data.

4. The system of claim 1, further comprising an image restorer which uses the image to restore user data.

5. The system of claim 4, wherein the restorer restores the user data to a destination that is within the same partition as the image.

6. The system of claim 4, wherein the restorer restores the user data to a destination that is outside the partition that contains the image.

7. The system of claim 4, wherein the system further comprises an image locator which uses system data to locate the image within the partition.

8. The system of claim 7, wherein multiple images are stored in the partition and the image locator locates a specific image from which the image restorer can restore user data.

9. The system of claim 7, wherein the image locator uses system data read from a removable persistent storage medium.

10. The system of claim 7, wherein the image locator uses system data read from a fixed location in the partition.

11. The system of claim 7, wherein the image locator uses system data read from a different partition than the partition that contains the image.

12. The system of claim 7, wherein the image locator uses system data read from an image container.

13. The system of claim 12, wherein the different partition is a diagnostic and recovery partition.

14. The system of claim 7, wherein the system data includes file system data.

15. The system of claim 14, wherein the system data includes a copy of the partition table and the image restorer restores the image when the copied partition table is damaged.

16. The system of claim 14, wherein the system data includes a copy of the boot record and the image restorer restores the image when the copied boot record is damaged.

17. The system of claim 14, wherein the system data includes a copy of a file allocation table and the image restorer restores the image when the copied file allocation table is damaged.

18. The system of claim 14, wherein the system data includes a copy of a master file table and the image restorer restores the image when the copied master file table is damaged.

19. The system of claim 14, wherein the system data includes a copy of inode information and the image restorer restores the image when the copied inode information is damaged.

20. The system of claim 1, further comprising an image verifier which verifies the integrity of the image.

21. The system of claim 1, further comprising an image creator which creates an image of at least a portion of the user data and stores the created image within the partition.

22. The system of claim 1, wherein at least one image within the partition is an end-user image.

23. The system of claim 1, wherein at least one image within the partition is a factory image.

24. The system of claim 1, wherein at least one image within the partition is an incremental image.

25. The system of claim 24, wherein the incremental image is incremental with respect to a factory image.

26. The system of claim 1, comprising at least two images stored in the partition, one of the images being a user image and another of the images being a factory image.

27. The system of claim 1, wherein the image is stored contiguously.

28. The system of claim 1, wherein the image is stored at one end of the partition.

29. The system of claim 1, wherein the image is stored as a file.

30. The system of claim 1, wherein the image is one of at least one image that is stored in an image container.

31. The system of claim 1, wherein the file system data includes FAT file system data.

32. The system of claim 1, wherein the file system data includes NTFS file system data.

33. The system of claim 1, wherein the file system data includes file system data of a UNIX-like file system.

34. A method of utilizing a partition within a computer system, the method comprising the computer-aided steps of:
obtaining a copy of user data which is stored in the partition; and
creating an in-partition image by at least storing a copy of at least a portion of the user data in at least one image in the same partition.

35. The method of claim 34, wherein the method comprises reading an IBM-compatible partition table.

36. The method of claim 34, wherein the obtaining step comprises reading user data directly from the partition.

37. The method of claim 34, wherein the obtaining step comprises reading user data from a previously created image of the partition.

38. The method of claim 34, wherein the creating step creates an in-partition factory image of the partition.

39. The method of claim 34, wherein the creating step creates an in-partition user-generated image of the partition.

40. The method of claim 39, further comprising the step of updating the user-generated image within the partition.

41. The method of claim 39, wherein the creating step comprises vacating the end of the partition to make room for the user-generated image of the partition.

42. The method of claim 34, wherein the storing step comprises storing an image of the partition in a subdirectory of the partition which is dedicated for holding at least one image of the partition.

43. The method of claim 34, further comprising the computer-aided steps of reading system data which is stored in the partition, and storing a copy of at least a portion of the system data in the image in the partition.

44. The method of claim 34, further comprising the computer-aided steps of reading system data which is stored in the partition, and storing a copy of at least a portion of the system data outside the partition.

45. The method of claim 34, wherein the storing step comprises storing an image of the partition in a file in the partition.

46. The method of claim 34, wherein the storing step comprises storing an image of the partition in an image container in the partition.

47. The method of claim 34, wherein the storing step comprises storing an image of the partition contiguously in the partition.

48. The method of claim 34, wherein the storing step comprises storing an image of the partition non-contiguously in the partition.

49. The method of claim 34, further comprising the step of restoring selected user data using the image.

50. A computer program storage medium having a configuration that represents data and instructions which will cause at least a portion of a computer system to perform method steps for utilizing a partition within a computer system, the method steps comprising the steps of locating an image of the partition which is stored in the partition, and restoring selected user data from the image to the partition.

51. The configured program storage medium of claim 50, wherein the partition is a bootable primary partition.

52. The configured program storage medium of claim 50, wherein the method further comprises the step of verifying the consistency and integrity of the image before the restoring step.

53. The configured program storage medium of claim 50, wherein the method further comprises the step of verifying the consistency and integrity of the image after the restoring step.

54. The configured program storage medium of claim 50, wherein the locating step locates the image in an image container, and the restoring step restores user data from the image despite damage to the image container.

55. The configured program storage medium of claim 50, wherein the locating step locates the image among at least two images in an image container, and the restoring step restores user data from the image despite damage to another image in the image container.

56. The configured program storage medium of claim 50, wherein the restoring step restores user data to the partition from the image stored in the partition without overwriting the image.

57. The configured program storage medium of claim 50, wherein the method further comprises the step of making a recovery aid by copying selected system data onto a removable persistent storage medium, and the locating step uses the recovery aid to locate the image.

58. The configured program storage medium of claim 57, wherein the locating step uses the recovery aid to obtain a copy of a partition table identifying the partition.

59. The configured program storage medium of claim 57, wherein the locating step uses the recovery aid to obtain a copy of file system data for the partition.

60. A configured medium comprising a persistent computer-readable storage medium, an imaged partition containing user data and a partition image including at least a portion of the user data, the configured medium further characterized in that the partition image is stored within the imaged partition on the persistent computer-readable storage medium.

61. The configured medium of claim 60, wherein the partition image is stored within a dedicated subdirectory of the imaged partition.

62. The configured medium of claim 60, wherein the partition image is stored at an end of the imaged partition.

63. The configured medium of claim 60, wherein the partition image is stored within an image container.

64. The configured medium of claim 63, wherein the image container also contains a copy of file system data.

65. The configured medium of claim 60, further comprising at least one additional partition image which is also stored in the imaged partition.

66. The configured medium of claim 60, wherein the imaged partition includes FAT file system data organizing the user data.

67. The configured medium of claim 60, wherein the imaged partition includes NTFS file system data organizing the user data.

68. The configured medium of claim 60, wherein the imaged partition includes UNIX-like file system data organizing the user data.

* * * * *